Aug. 8, 1933.  C. W. BRABBEE  1,922,014
HUMIDIFYING APPARATUS
Filed Nov. 28, 1931  4 Sheets-Sheet 1
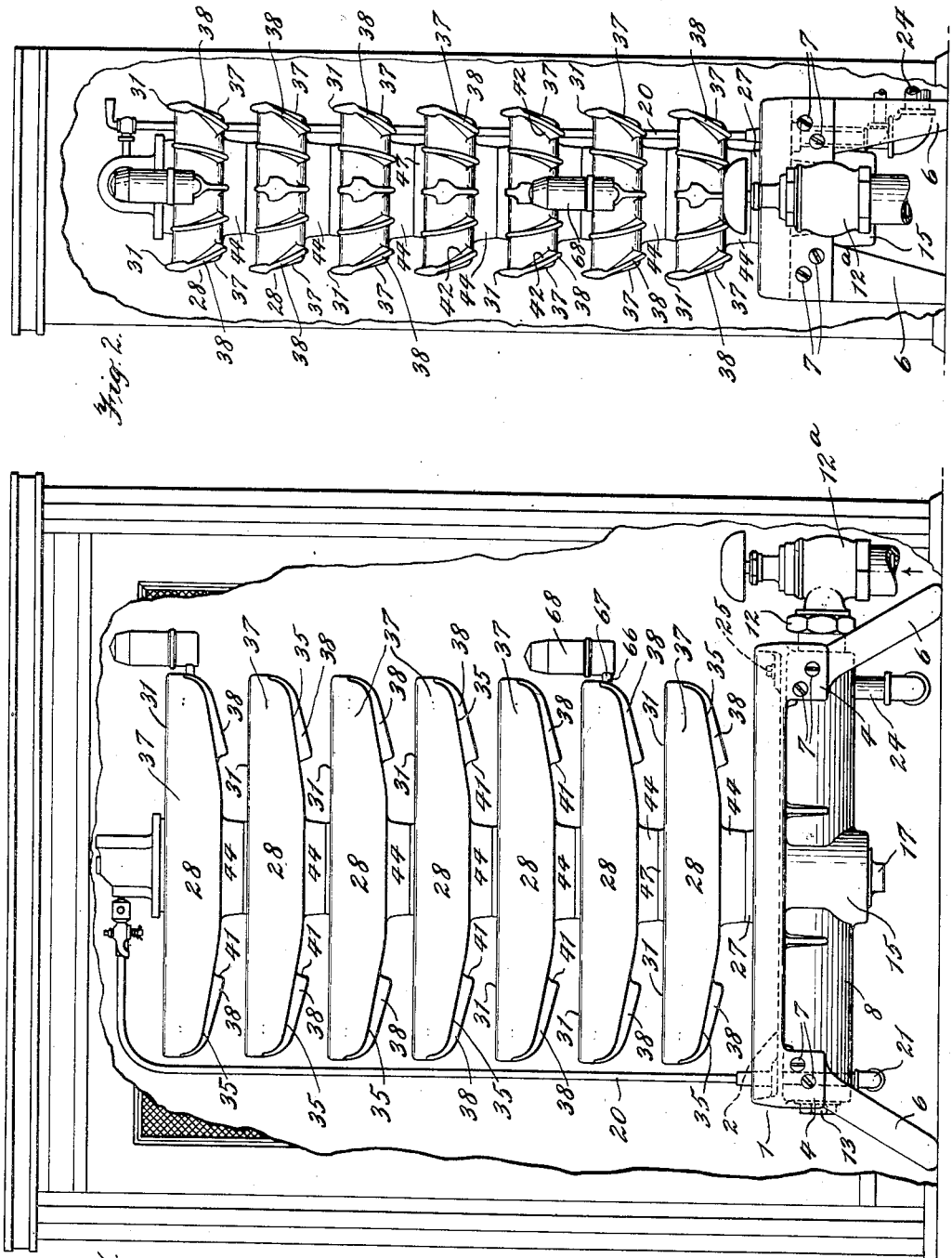

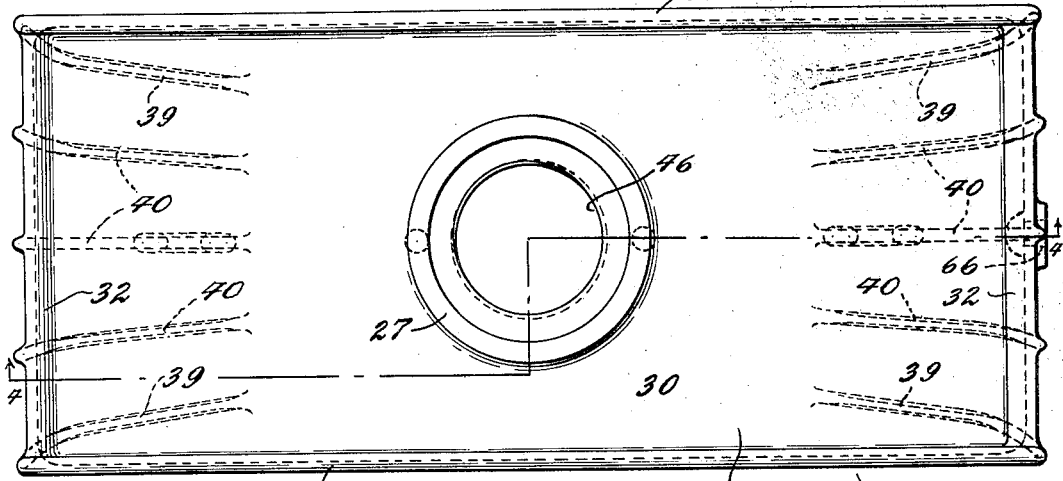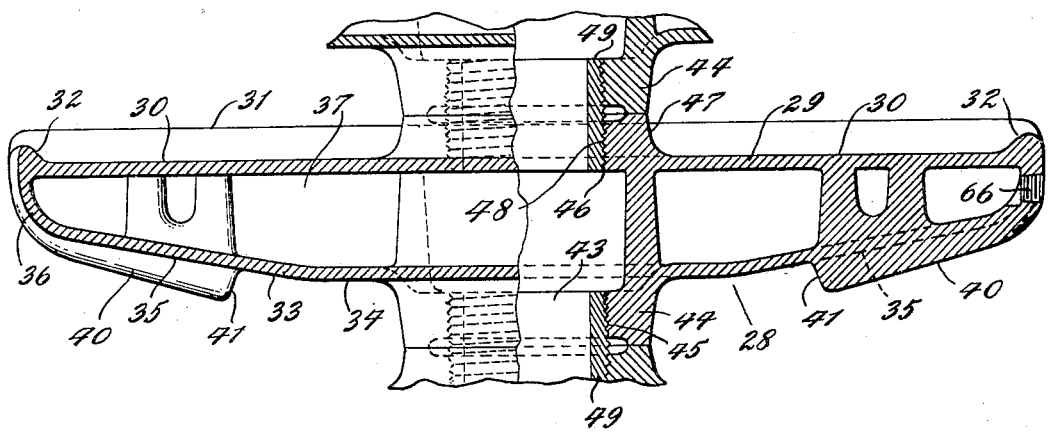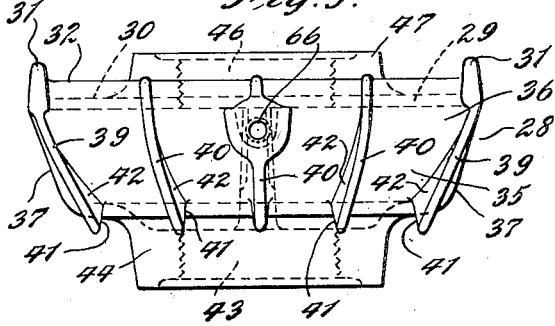

Aug. 8, 1933.   C. W. BRABBEE   1,922,014
HUMIDIFYING APPARATUS
Filed Nov. 28, 1931   4 Sheets-Sheet 3
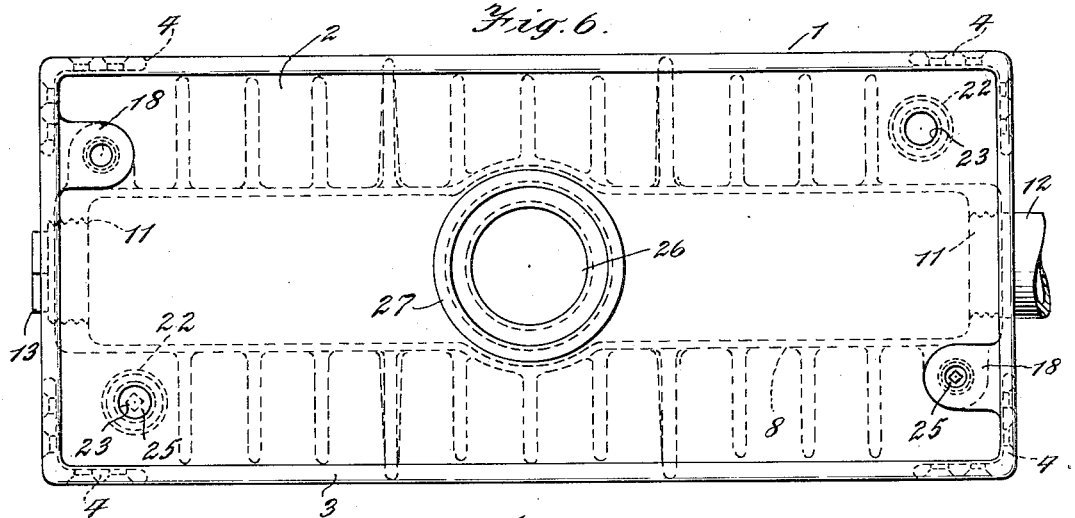
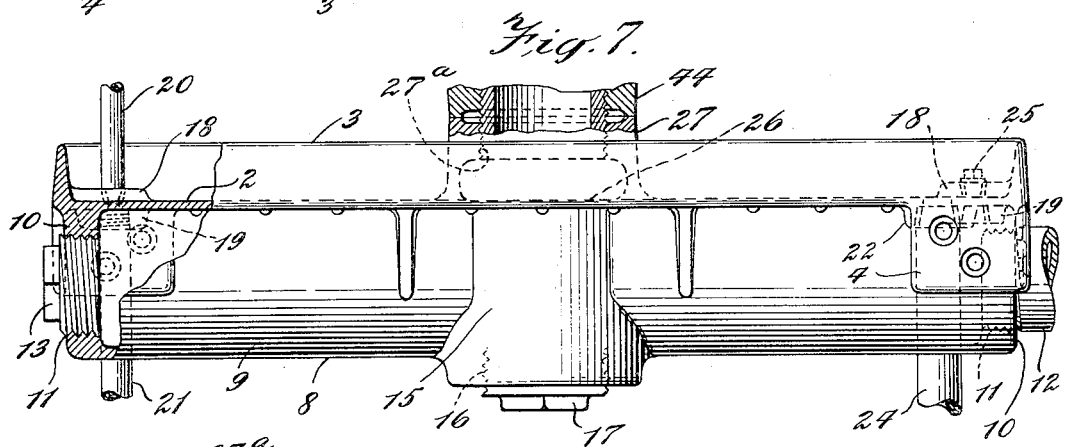
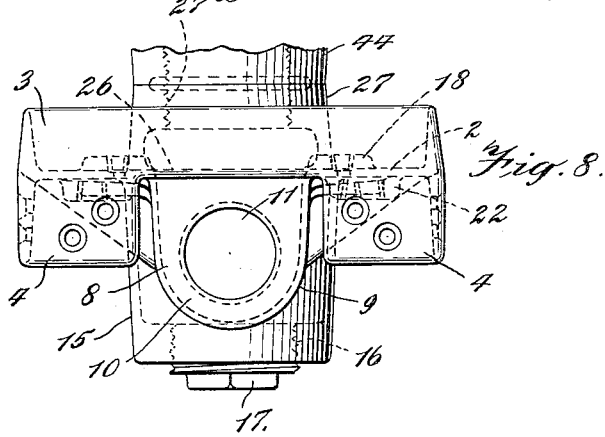
INVENTOR.
Charles W. Brabbee
BY
ATTORNEY.

Aug. 8, 1933.  C. W. BRABBEE  1,922,014
HUMIDIFYING APPARATUS
Filed Nov. 28, 1931  4 Sheets-Sheet 4
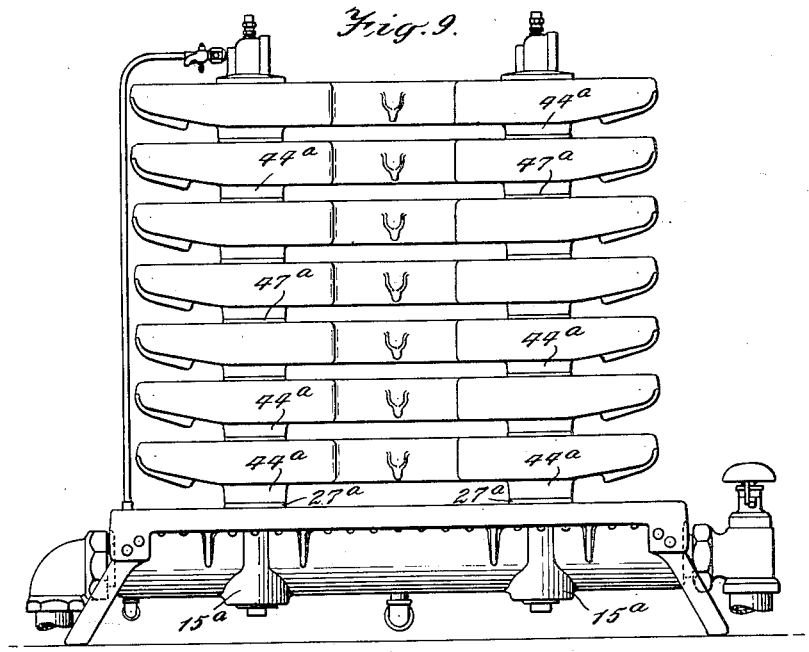
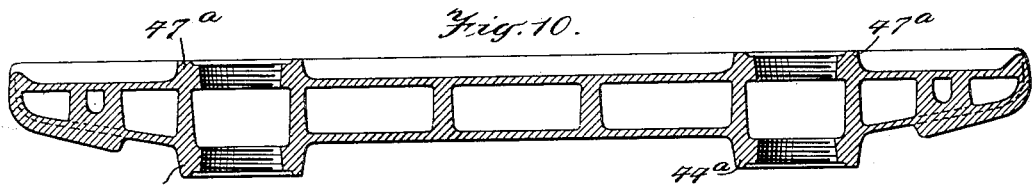
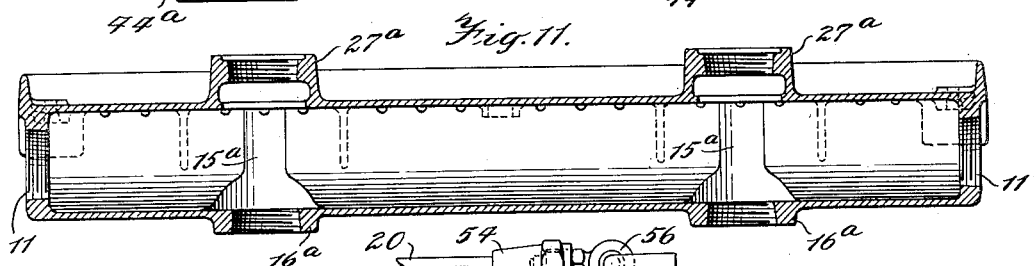
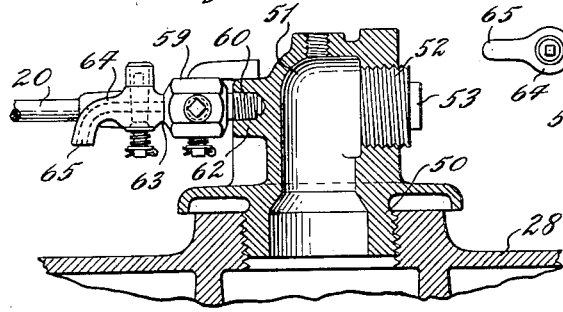
INVENTOR.
Charles W. Brabbee
BY
his ATTORNEY.

Patented Aug. 8, 1933

1,922,014

UNITED STATES PATENT OFFICE 1,922,014

HUMIDIFYING APPARATUS

Charles W. Brabbée, Bronxville, N. Y., assignor to American Radiator Company, New York, N. Y., a Corporation of New Jersey Application November 28, 1931
Serial No. 577,751

18 Claims. (Cl. 257—180)

My invention relates broadly and generally to new and useful improvements in humidifying apparatus of that character or type for supplying humidity or moisture to the atmosphere of a desired compartment or enclosure, such as a room or dwelling, but I desire it understood that the invention is not limited either by structure or use to any particular form or type of the compartment or enclosure, the atmosphere of which is to be humidified or supplied with moisture.

The primary object of the invention is to provide a novel humidifying apparatus which will be simple in construction and efficient in operation, and which will deliver to the atmosphere the desired amount of moisture, and at such rate as to create or maintain a desired humidity relative to the temperature of the air in the compartment or enclosure.

The invention consists in the improved construction and combination of parts and their aggroupment in operative arrangement, as will be fully described hereinafter and the novelty of which will be particularly pointed out and distinctly claimed.

I have fully and clearly illustrated my invention in the accompanying drawings to be taken as a part of this specification, and wherein—

Figure 1 is a view in side elevation of a preferred embodiment of the invention, the same being shown housed in a suitable enclosure or cabinet, the front portion of which being broken away to disclose said embodiment;

Fig. 2 is an end elevation of the embodiment shown in Fig. 1, having the cabinet end wall broken away;

Fig. 3 is a plan view of one of the sections or elements for evaporating water or other humidifying fluid;

Fig. 4 is a section on the line 4—4 of Fig. 3, and showing the flow connections for communicatively connecting the elements or sections to each other;

Fig. 5 is an end view of one of the elements or sections shown in the previous views;

Fig. 6 is a plan view of a drain receptacle shown in Figs. 1 and 2;

Fig. 7 is a front view of the pan shown in Fig. 6, parts being in section and others broken away for clearness;

Fig. 8 is an end elevation of the pan shown in Figs. 6 and 7;

Fig. 9 is a view in front elevation of another embodiment of my invention;

Fig. 10 is a longitudinal, central section through one of the elements or sections employed in the embodiment shown in Fig. 9;

Fig. 11 is a longitudinal, central section of the drain pan employed in the form shown in Fig. 9;

Fig. 12 is a plan view of a water supply means and coupling element shown in elevation in Figs. 1, 2 and 9, and Fig. 13 is a central section through the coupling element shown in Fig. 12, and also showing in side elevation the water supply means.

Before proceeding with a detailed description of the embodiments illustrated, I would state that the invention is capable of numerous exemplifications within the scope of the appended claims, but I have shown and will hereafter describe the same as being embodied in an apparatus capable of the dual function of heating the atmosphere and supplying moisture in the form of water vapor thereto, so that simultaneously with the heating effect produced, a desired degree of humidity relative to the atmospheric temperature may be created or maintained. In this embodiment, as shown, the apparatus includes a plurality of chambered elements or sections, preferably connected communicatively to receive internally a suitable fluid heating medium, such, for example, as steam, and the elements having external surfaces to receive a humidifying fluid such as water, the heat supplied from the heating medium serving to heat the elements to thereby vaporize the water on the external surfaces, the elements being constructed to cause downflow of the water from one element to another, and the vapors being liberated into the atmosphere to humidify the latter. The elements are preferably made of cast iron, and may, if desired, be coated externally with vitreous enamel, or other suitable coating material to protect the elements from oxidation and facilitate cleaning when desirable.

Referring to the drawings by characters of reference, 1 designates a base element, shown as a pan or receptacle made preferably of cast iron, the same being substantially rectangular in oblong form, as shown in Fig. 6, and including a bottom wall 2 from which rises a surrounding wall 3 forming with the bottom wall a liquid receptacle for a purpose to be presently described. At the respective corners thereof, the receptacle is provided with depending angular flanges 4, in which are seated the heads of legs 6, the heads being secured to the flanges by means of screws 7. The legs are of such height as to support the pan above a floor or other surface upon which the legs rest.

The receptacle 1 is provided with a receiving chamber or conduit 8 cast integral with the bottom wall 2, and preferably the bottom face thereof, said chamber being arranged centrally and longitudinally of the bottom wall and formed in part by said wall 2, a transversely curved wall 9, and end walls 10. The end walls 10 are formed with internally threaded openings 11, either one of which is adapted to receive threadedly a pipe fitting 12 leading to or from a supply of heating fluid, such as heating steam from a suitable source, such as the usual steam boiler of a steam heating system, the flow of the heating fluid being controlled by any well known form of valve 12a. The threaded opening or openings not employed are closed by a screw plug 13.

In the form shown in Figs. 1, 2, 6, 7 and 8, the side walls of the receiving chamber 8 are enlarged laterally to form an enlargement 15, the lower end of which is formed with a downwardly directed and internally threaded opening 16, which is closed by a threaded plug 17, for a purpose to be presently described.

Adjacent one end thereof, the bottom wall 2 is provided with upper and lower alined bosses 18, 19 to receive the ends of pipes 20, 21, which communicate through the alined apertures in the bosses to form a conduit from any suitable source of water supply. Also on the bottom wall 2 is a boss 22 having an opening 23, preferably flush with the upper face of the bottom wall and constituting a drain for liquid received by the receptacle. A drain pipe 24 is threaded into the boss 22 to lead the drain water to any desired point of disposal. Both ends of the receptacle may be supplied with the bosses 18, 19 and 22, so as to facilitate connection of the water supply pipe 20, 21 and drain pipe 24, according to the location of the receptacle relative to the house water supply and drain connections. The bosses not used are closed by threaded plugs 25.

The bottom wall 2 is provided with an opening 26 located preferably at the central point laterally and longitudinally of said wall, and in vertical axial alinement with the enlargement 15, and rising from the upper face of the wall 2 and surrounding the opening 26 is a coupling member 27 which is preferably internally threaded, as shown at 27a.

Supported on the base or supporting member provided by the receptacle 1, is one, or a plurality of horizontally disposed and vertically spaced chambered elements or sections 28, in this embodiment constituting heating and humidifying elements. Each of these elements 28 preferably comprises an integral structure made of cast iron, or of suitable metal, according to well known foundry practice, and includes an upper, substantially horizontal wall 29, the upper outer face of which constitutes a surface 30 adapted to receive water to be vaporized for humidifying the atmosphere. The element and the wall 29 are preferably rectangular in plan and oblong in form, and the sides or longer edges of the surface 30 are provided with vertical walls in the form of beads or flanges 31 coextensive with the length of said surface and serving to prevent liquid on said surface from overflowing the sides of the element. The transverse ends of the wall 29 provide for overflow of the liquid from the surface 30, and are preferably each provided with a vertical flange 32 of less height than the walls 31, so that the height of liquid on the surface is restricted to the height of the flange 32, the latter, together with the walls 31 serving to retain a body of water on the surface 30, but the flanges 32 permitting overflow of the water over the ends of the element when the depth of the water exceeds the height of said flanges.

Each element also includes a bottom wall, indicated generally at 33, the central portion of which lies in a plane substantially parallel to that of the wall 29, as indicated at 34, said central portion being connected to the transverse ends of the upper wall by means of upwardly inclined wall portions 35, which at their extreme end portions are curved upward, as at 36, and merge into the walls or flanges 32. The outer faces of the curved portion 36 and inclined portions 35 are preferably disposed at such an angle to the overflow edge of the flange 32 as to cause the water flowing over the flange 32 to adhere to and flow down over the outer faces of said portions, and not gravitate in a vertical line or in a direction away from the end of the element. The side edges of the upper and bottom walls are united to each other by said walls 37 cast integral therewith, so as to form a chambered element adapted to receive within the same a suitable fluid heating medium.

Provision is made for causing the liquid overflowing from the element to be delivered onto a lower element, this being accomplished by means of a plurality of substantially vertical fins cast integral with and projecting outwardly and downwardly from the lower, outer face of the inclined and curved portions 35, 36 of the bottom wall 33. In the embodiments illustrated, each overflow end of the element is provided with five of these fins, including two outer or side fins 39, the upper or outer ends of which merge with the ends of the side walls 31, and the lower or inner ends of which terminate at points inward of the overflow end of the element, and preferably about midway of said end and the vertical, central axis of the element. Between the side fins and suitably spaced therefrom and from each other, are three fins 40. It is to be noted that these fins 39 and 40 increase in depth from the overflow edge of the element to the inner ends thereof, at which point the fins terminate abruptly, as at 41. It is also to be noted that the outermost fins 39 and the two next adjacent fins 40 converge inwardly from their upper ends toward their lower, inner ends, relative to a vertical plane extending through the longitudinal center of the element, so that the inner side faces of the fins serve as flow surfaces 42 to receive and cause the overflowing liquid to be directed toward the central portion or area of a lower element.

In order that the chambered elements may be assembled with the interiors thereof in communication, the lower wall 33 of the element, as above described, is provided with a flow opening 43 located midway between the ends of the element and the sides thereof, and cast integral with the outer face of said wall is a downwardly projecting, annular coupling flange 44 alining with and surrounding said opening 43, said flange being interiorly screw-threaded, as at 45. The upper wall of the element is provided with a flow opening 46 in vertical, axial alinement with the opening 43, and alining with and surrounding the opening 46 is a vertical annular flange 47 which is interiorly threaded, as at 48. The threads 45 and 48 are in opposite directions, that is, right-hand and left-hand, respectively.

In assembling the apparatus on the base 1, the elements 28 are arranged in superposed relation, as shown in Fig. 1, with the coupling member 44 on the lowermost element in alinement with and resting on the coupling flange 27 on the base, and with the respective upper and lower coupling flanges in engagement and alinement, as shown in Figs. 1 and 4. The engaging coupling members are then connected and drawn into fluid-tight engagement by means of oppositely threaded sleeves or nipples 49, so that a rigid assembly is provided with the interiors of the elements and the interior of the chamber 8 in communication through the nipples and respective flow openings associated therewith. The assemblage is effected by a suitable tool inserted through the opening 16 or through the opening 46 in the uppermost element, it being understood that the opening 16 is then closed by the plug 17.

In the preferred embodiment of the invention, the elements 28 are of substantially equal, horizontal form and dimension, so that when assembled, the sides and overflow ends thereof will be in substantial, vertical alinement, the horizontal area of the elements being preferably less than that of the pan or receptacle 1, so that unevaporated liquid flowing from the elements will finally be collected in the receptacle.

The opening 46 in the upper element is closed by a suitable closure element consisting of a threaded plug 50 having a chambered, upper portion 51 formed with a lateral flow port 52, which is internally threaded to receive a closure plug 53 when the assemblage takes the form shown in Fig. 1—that is, for use in connection with what is known as a "one-pipe steam system", wherein the supply of steam to and the return of the water of condensation from a heat-emitting element, such as a radiator, takes place through the same passage.

The means for supplying water to the elements 28 for evaporation thereof by the heat of said elements, may take a number of forms, but I have shown a preferred form of such means, which is as follows: The water feed pipe 20 extends vertically to a point above the uppermost element 28, and at its upper end is connected by a coupling 54 to the inlet port 55 of a suitable hand-valve 56, the outlet nipple 57 of which is connected by a pipe section 58 to a hollow coupling member 59 having a stem 60 threaded, as at 61, into a boss 62 on the member 51. The coupling member 59 is connected to the inlet 63 of a turn-plug valve 64 having a discharge 65 directed toward the liquid receiving surface 30 of the uppermost element 28. The valve 56 is employed to turn off and turn on the supply of water, and the valve 64 is preferably of the key-operated type operable to be set to limit the maximum amount of water which will be delivered when the valve 56 is open to the maximum. The boss 62 and coupling member 59 serve as a rigid support for the upper portion of the water supply system and valves described.

The operation of the embodiment heretofore described is as follows: The hand valve 12ª is open to permit steam to flow into the distributing chamber 8, whence it passes up through the couplings and nipple connections into the elements 28, heating the latter so that they become heat-emitting elements. The valves 56 and 64 are then set to deliver water at a desired rate upon the receiving surface 30 of the uppermost element. The water delivered from the valves gradually accumulates on the upper element until it attains a depth sufficient to overflow the walls or flanges 32. When the water overflows the ends of the upper element, it adheres to the curved and inclined under surfaces 36 and 35 and flows down the same to a point between but remote from the overflow ends of the next lower element. The water overflowing from an upper element is guided inward by the outer, inclined fins 39 and surfaces 42 thereof, and drips from the undersurface 35 and from the abrupt ends 41 of the fins, which, being located laterally inside of the side flanges 31 of the next lower section, cause the water to be delivered onto the surface 30 of the lower section at points inward of said side flanges, thus preventing dribbling over the sides of the latter. The same is true of the intermediate fins 40 with respect to the water which flows over the central portion of the flange 32.

The water flows in the manner just described to and from each element, a portion thereof being evaporated during such flow, and the unevaporated water finally being collected in the pan 1, whence it escapes through the drain 24. One or more of the sections may be provided with tap holes 66 to receive a nipple connection 67 for any suitable type of air relief valve 68, so as to provide for venting of the air in the sections in a well known manner.

In Figs. 9 to 11 inclusive, I have shown a modification of the invention for use in cases requiring elements of greater size, and therefore of greater length and horizontal area than those shown in Figs. 1 to 8. In this modification the only differences consist in providing the base receptacle, and the several elements or sections, with a plurality of upper and lower cooperable couplings 44ª, 47ª, instead of a single, central coupling, as shown in Figs. 1 to 8, and in providing the base with two enlargements 15ª instead of one. In all other respects the base and the sections are constructed and operate the same as shown and described with respect to Figs. 1 to 8. It will be noted that in the modified form the coupling elements are remote from the overflow edges of the elements, and that the water guiding flanges on the under end faces of the elements deliver the water from an upper element to a lower element at a point between the overflow edge and the coupling element, in the same manner as in the form shown in Figs. 1 et seq.

The construction and arrangement of both forms of the invention illustrated and above described, provides a combined heating and humidity supplying apparatus which will function when regulated to provide and maintain a desired moisture of the atmosphere relative to the temperature. The invention also provides a humidifying apparatus which can either be supplied with heating fluid from a source independent of the usual house-heating system, or can be supplied with heating fluid from any of the well known types of fluid heating systems, for example, one-pipe steam; two-pipe steam, or vacuum or vapor systems. In the drawings the apparatus is shown assembled for use with a one-pipe steam system, and in Fig. 9 a hot water system, as before described, but if it is desired to use the apparatus with a two-pipe steam system, it is only necessary to connect the supply pipe for the heating fluid to the opening 52 on the member 50, and to connect a return pipe to either one of the openings 11 communicating with the chamber 8, the other opening 11 being closed by a suitable plug 13. If it is desired to use the apparatus in a vacuum or vapor system, the heating fluid supply pipe is connected to the opening 52 and a return pipe containing a suitable steam trap of any type well known in the art is connected to either one of the openings 11. It is believed unnecessary to illustrate these connections, as they will be obvious from the foregoing description to anyone skilled in the art to which the invention appertains.

What I claim and desire to secure by Letters Patent of the United States is:

1. An apparatus of the character described, comprising a plurality of superposed horizontally disposed chambered elements vertically spaced from each other, certain of said elements having an upper wall the outer face of which is substantially horizontal and constituting a liquid-receiving surface, means at the sides of said certain of said elements to retain liquid on said surface, said certain of said elements being provided at the opposite ends thereof with means permitting liquid to flow from said surface over said opposite ends, the under face of said element adjacent said ends being formed to cause liquid flowing over the ends of said certain of said elements to flow over the under surface thereof, means to guide the overflowing liquid on said under surface, means for supplying liquid onto certain of said liquid-receiving surfaces between said ends, and means for admitting a fluid heating medium into said elements.

2. An apparatus of the character described, comprising a plurality of superposed horizontally disposed chambered elements vertically spaced from each other, certain of said elements having an upper wall the outer face of which is substantially horizontal and constituting a liquid-receiving surface, means at the sides of said certain of said elements to retain liquid on said surface, said certain of said elements being provided at the opposite ends thereof with means permitting liquid to flow from said surface over said opposite ends, fin means on the underside of said certain of said elements to receive liquid flowing over the ends of such element, means for supplying liquid onto certain of said surfaces between said ends, and means for admitting a fluid heating medium into said elements.

3. A device of the character described, comprising a plurality of superposed horizontally disposed chambered elements vertically spaced from each other and communicatively connected to each other intermediate their ends, each element including an upper wall the outer face of which constitutes a liquid-receiving surface and having overflow means at the opposite ends thereof permitting liquid to flow from said surface over said opposite ends, and means at the ends of said elements to conduct the overflowing liquid onto the liquid-receiving surface of a lower one of said elements at a point intermediate the ends thereof, said means comprising a fin-like member extending at one end thereof from said overflow means, and at the other end thereof terminating between said elements at a point remote from the overflow means.

4. A device of the character described, comprising a plurality of superposed chambered elements spaced vertically from each other, certain of said elements having an upper substantially horizontal wall the outer face of which constitutes a liquid-receiving surface, and said certain of said elements having a lower wall underlying said upper wall, said walls merging at the opposite ends of the element and the outer face of the lower wall at each end inclining downward and inward from the end of the element, overflow means at the point of merger of said walls and arranged to deliver the overflow from the liquid-receiving surface onto the inclined outer face of said lower wall, and means intermediate the ends of said elements for communicatively connecting the chambers thereof.

5. A device of the character described, comprising a plurality of superposed chambered elements spaced vertically from each other, each element having an upper substantially horizontal wall the outer face of which constitutes a liquid-receiving surface, each said element having a lower wall underlying said upper wall, said walls merging at the opposite ends of the element, and the lower wall at each end inclining downward and inward from the end of the element, overflow means at the point of merger of said walls and arranged to deliver the overflow from the liquid-receiving surface onto the inclined outer face of said lower wall, means intermediate the ends of said elements for communicatively connecting the chambers thereof, and liquid conducting fin means on the outer face of said downwardly inclined wall.

6. An apparatus of the character described, comprising a plurality of superposed elements, each element including a substantially horizontal upper wall the outer face of which constitutes a liquid-receiving surface, and a lower wall underlying the upper wall, coupling means at intermediate portions of said upper and lower walls for communicatively connecting said elements, means for supplying a fluid heating medium to said elements, overflow means at the oposite ends of each of said liquid-receiving surfaces, and means associated with each of said overflow means for conducting the overflowing liquid onto a lower element between its overflow means and said coupling means.

7. An apparatus of the character described, comprising a plurality of superposed chambered elements vertically spaced from each other, each of said elements including an upper wall having a substantially horizontal surface constituting a liquid-receiving surface, and each element being provided at its opposite ends with overflow means for liquid on said surface, said outer surfaces being of the same length between said opposite ends, and the overflow means on the respective elements being in substantially vertical alinement, and means whereby the overflow from each element is caused to flow therefrom onto the receiving surface of a lower element between the overflow ends thereof, said means including fin members extending from said overflow means along the underface of the element.

8. A device of the character described, comprising a cast metal, chambered element including upper and lower walls, the upper wall being substantially horizontal and rectangular, and having a substantially horizontal outer upper face constituting a liquid receiving surface, said upper wall having at two of its opposite sides means to prevent overflow of liquid from said face, and the other two opposite sides having means at the edges thereof to permit overflow of liquid above a determined depth from said face over said edges and said element having means to admit a fluid medium to the chamber therein to heat the element to cause evaporation of liquid on said face.

9. A device of the character described, comprising a chambered element having means for supply of a fluid heating medium thereto, said element including an upper wall having a substantially flat horizontal outer face constituting a liquid-receiving surface, said element having side flanges and an end flange at each of its opposite ends forming with said upper wall a liquid receptacle, said end flanges being of less height than the side flanges to constitute an overflow means from said receptacle, and said element having a lower wall underlying said upper wall, and fins on said element and extending from said end flanges over the outer face of said lower wall and depending therefrom.

10. A device of the character described, comprising a chambered element having means for supply of a fluid heating medium thereto, said element including an upper wall having a substantially flat horizontal outer face constituting a liquid-receiving surface, said element having side flanges and an end flange at each of its opposite ends forming with said upper wall a liquid receptacle, said end flanges being of less height than the side flanges to constitue an overflow means from said receptacle, and said element having a lower wall underlying said upper wall, and fins on said element and extending from said end flanges over the outer face of said lower wall and depending therefrom, said fins gradually increasing in height from said end flanges to points on said under wall, inwardly of the ends of the element.

11. A device of the character described, comprising a cast metal chambered element including an upper wall and a lower wall, said upper wall being substanially flat and rectangular and constituting a liquid-receiving surface, vertical side flanges for retaining liquid on said surface, and opposite ends of the element having means permitting overflow of liquid from said surface, ports through said walls and alining with each other, and said lower wall inclining downwardly from the ends of the element toward the port in the lower wall.

12. A device of the character described, comprising a cast metal chambered element including an upper wall and a lower wall, said upper wall being substantially flat and rectangular and constituting a liquid-receiving surface, vertical side flanges for retaining liquid on said surface, and opposite ends of the element having means permitting overflow of liquid from said surface, ports through said walls and alining with each other, said lower wall inclining downwardly from the ends of the element toward the port in the lower wall, and means for guiding the liquid from the overflow over said lower inclined wall.

13. A device of the character described, comprising a cast metal chambered element including an upper wall and a lower wall, said upper wall being substantially flat and rectangular and constituting a liquid-receiving surface, vertical side flanges for retaining liquid on said surface, and opposite ends of the element having means permitting overflow of liquid from said surface, ports through said walls and alining with each other, said lower wall inclining downwardly from the ends of the element toward the port in the lower wall, and means for guiding the liquid from the overflow over said lower wall, said means being a plurality of fins on said inclined portions of the lower wall.

14. A device of the character described, comprising a cast metal chambered element having means for admitting a fluid heating medium thereto, said element including a substantially flat horizontal upper wall, a lower wall underlying said upper wall and merging at its opposite ends with the opposite ends of said upper wall, the outer face of said upper wall constituting a liquid-receiving surface, and an end portion of said lower wall being inclined downward from the end of said upper wall at such angle that liquid flowing from the last-named end of said upper wall will tend to flow down the under face of said inclined portion, and downwardly directed fins on said inclined portion to conduct the overflow liquid.

15. A device of the character described, comprising a cast metal chambered element having means for admitting a fluid heating medium thereto, said element including a substantially flat horizontal upper wall, a lower wall underlying said upper wall and merging at its opposite ends with the opposite ends of said upper wall, the outer face of said upper wall constituting a liquid-receiving surface, and an end portion of said lower wall being inclined downward from the end of said upper wall at such angle that liquid flowing from the last-named end of said upper wall will tend to flow down the under face of said inclined portion, and downwardly directed fins on said inclined portion to conduct the overflow liquid, said fins being inclined inwardly from the upper ends thereof toward the lower ends thereof to conduct the overflow inwardly from the side portions of the element.

16. A device of the character described, comprising a plurality of superposed horizontally disposed chambered elements vertically spaced from each other and communicatively connected to each other intermediate their ends, each element including an upper wall the outer face of which constitutes a liquid-receiving surface and having overflow means at the opposite ends thereof permitting liquid to flow from said surface over said opposite ends, a base supporting member including a pan to receive said liquid, and also including a receiving chamber, the bottom wall of said pan having a flow port communicating with said chamber, and means for supporting said elements on said member with the lowermost of said elements in communication with said receiving chamber through said flow port.

17. A device of the character described, comprising a plurality of superposed horizontally disposed chambered elements vertically spaced from each other and communicatively connected to each other intermediate their ends, each element including an upper wall the outer face of which constitutes a liquid-receiving surface and having overflow means at the opposite ends thereof permitting liquid to flow from said surface over said opposite ends, a base supporting member including a pan to receive said liquid, and also including a receiving chamber, the bottom wall of said pan having a flow port communicating with said chamber, and means for supporting said elements on the bottom wall of said pan with the lowermost of said elements in communication with said receiving chamber through said flow port.

18. A device of the character described, comprising a cast metal chambered element having upper and lower walls, the upper wall having a substantially horizontal outer upper face constituting a liquid receiving surface, said upper wall having at two of its opposite sides means to prevent overflow of liquid from said face, and an edge of one of the other opposite sides having means to permit overflow of liquid above a determined depth from said face over said edge, the surface of the lower wall adjacent said edge being inclined to cause overflowing liquid to flow over said lower wall, fin means on said inclined portion of the lower wall to guide the liquid flowing over said lower wall, and means to admit a fluid medium to the chamber of said element.

CHARLES W. BRABBÉE.